Figure 1:
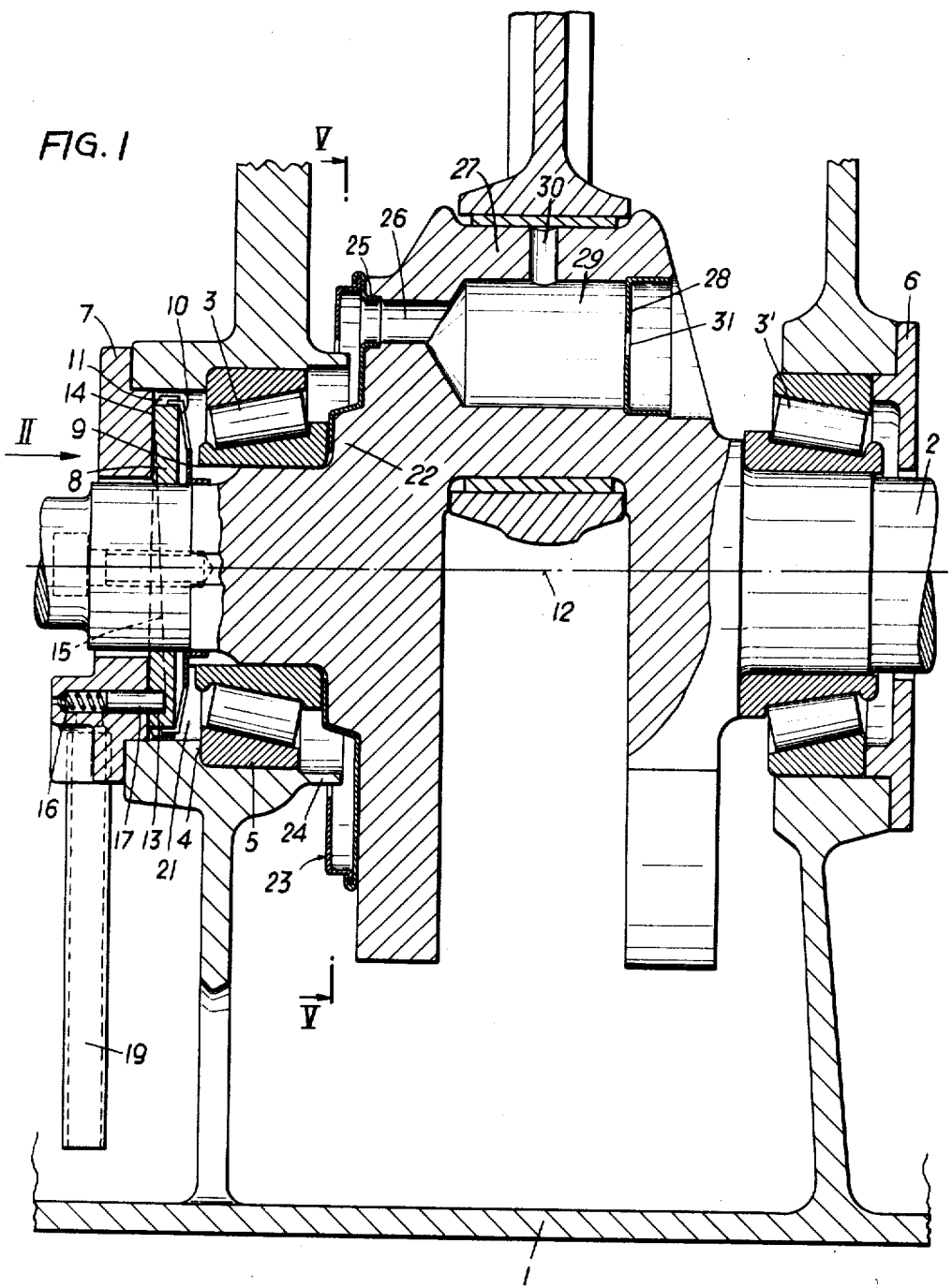

United States Patent

Schreiber et al.

[15] 3,703,178
[45] Nov. 21, 1972

[54] SINGLE-CYLINDER INTERNAL COMBUSTION ENGINE

[72] Inventors: Erich Schreiber; Fritz Freyn; John Noraberg, all of Graz, Austria

[73] Assignee: Hans List, Graz, Austria

[22] Filed: April 22, 1971

[21] Appl. No.: 136,507

[30] Foreign Application Priority Data

April 24, 1970 Austria.................A 3794/70

[52] U.S. Cl.................184/6.5, 123/196 R, 184/6.28
[51] Int. Cl................................F01m 1/06
[58] Field of Search....123/196 R; 184/6.28, 6.3, 6.5, 184/6.12

[56] References Cited

UNITED STATES PATENTS

| | | | |
|---|---|---|---|
| 3,096,850 | 7/1963 | Rosenqvist | 184/6.5 |
| 3,302,752 | 2/1967 | Shiokawa | 184/6.28 |
| 3,539,035 | 11/1970 | Wolkenstein | 184/6.12 |

FOREIGN PATENTS OR APPLICATIONS

| | | | |
|---|---|---|---|
| 725,679 | 9/1942 | Germany | 184/6.5 |
| 1,047,820 | 12/1958 | Germany | 184/6.12 |

*Primary Examiner*—Manuel A. Antonakas
*Attorney*—Watson, Cole, Grindle & Watson

[57] ABSTRACT

A single-cylinder internal combustion engine comprising a crankshaft running on tapered-roller bearings in the front walls of the crankcase and a vane-type oil pump for the supply of oil to the connecting-rod bearing at the crankpin of the crankshaft, consisting of a rotatively driven ring with a front-end annular groove whose depth diminishes to zero from a point of maximum depth as far as an opposite peripheral point and wherein an elastic pin engages dividing the space defined by the annular groove and an adjacent stationary abutment into a suction chamber impinged upon by oil and a delivery chamber, the latter communicating via an oil drainage hole and oil ducts in the crankshaft with a crossbore of the crankpin ending in the connecting-rod bearing.

6 Claims, 6 Drawing Figures

3,703,178

Inventors
Erich Schreiber
Fritz Freyn
John Noraberg
By Watson, Cole, Grindle & Watson

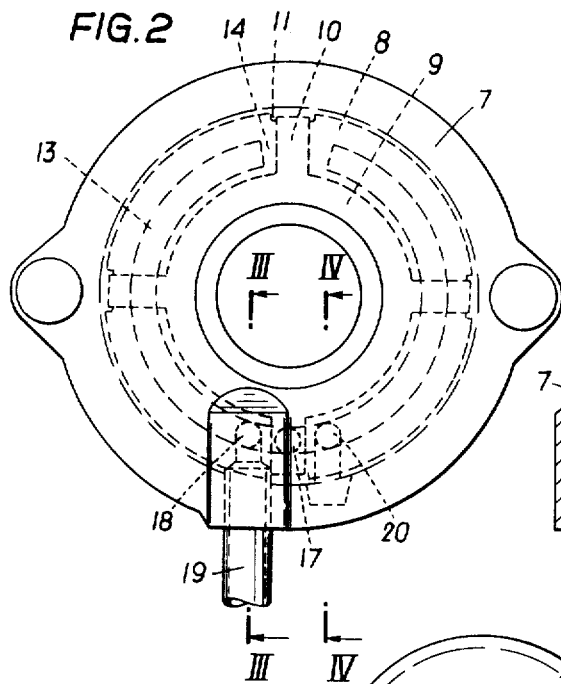
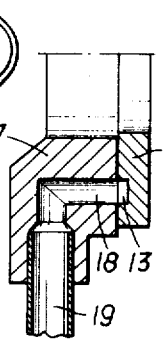
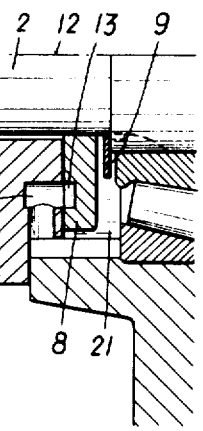
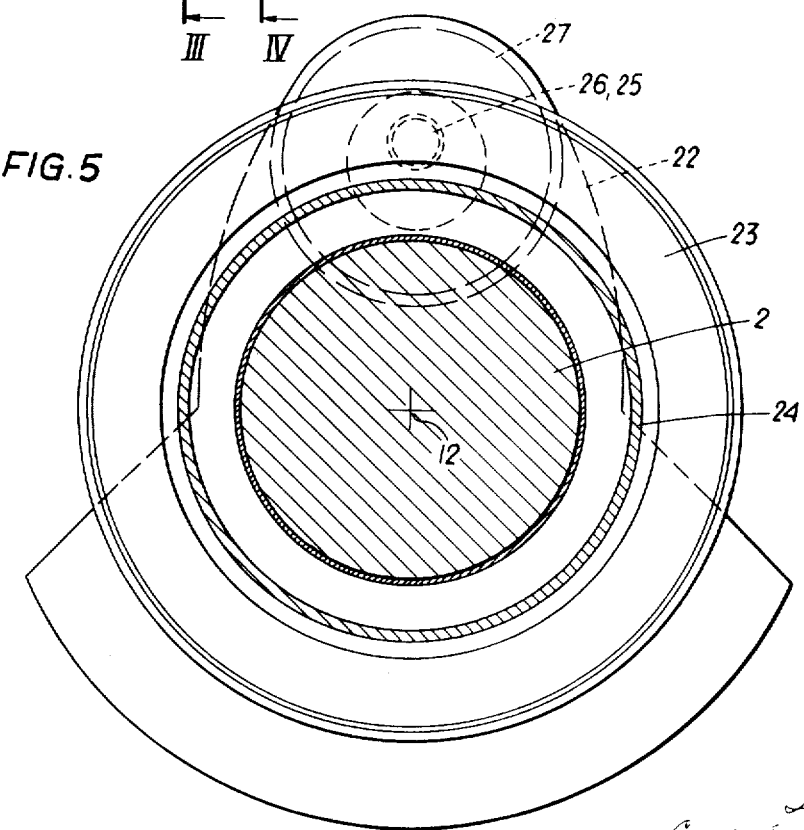

SINGLE-CYLINDER INTERNAL COMBUSTION ENGINE

The invention relates to a single-cylinder internal combustion engine comprising a crankshaft running on tapered-roller bearings and a connecting rod on friction bearings, and a lubricating means for supplying the connecting-rod bearing with lubricant.

As a rule, the connecting-rod bearing of single-cylinder internal combustion engines featuring antifriction bearings is formed by a plain bearing, because the use of antifriction bearings would either involve the need for a split crankshaft or a split antifriction bearing for the connecting-rod bearing and consequently, for an expensive and comparatively complicated design.

With connecting-rod bearings designed as plain bearings, however, certain difficulties are bound to arise in connection with the lubrication of the connecting-rod bearing due to the fact, that the use of a special oil pump for feeding this one and only point requiring forced lubrication generally appears to be unwarranted for economic reasons.

For the supply of lubricant to the connecting-rod bearing various types of scoop and spray-type lubricating systems have been used in the past. In actual operation, however, these systems are not absolutely reliable, particularly when the engine is still cold, since positive lubrication is by no means assured.

Moreover, it is not possible with conventional lubrication systems to have oil filtered, so that impurities are allowed to penetrate as far as the connecting-rod bearing to the detriment of the latter's length of service life.

It is the purpose of the present invention to provide a single-cylinder internal combustion engine of the type hereabove described, wherein the lubrication of the connecting-rod bearing is assured under all operational conditions by simple means. According to the invention, the lubricating means is designed as a vane-type oil pump driven either by means of the crankshaft or by a shaft drivingly connected to the former. This pump comprises a spring ring adjoining an integral abutment and rotating jointly with the pump shaft. The said ring is provided with an annular groove located in concentric relation to the axis of the pump shaft, the depth of said groove diminishing progressively until at one point of the circumference it becomes practically non-existent, the groove being engaged by a spring-loaded pin slidingly guided in the integral abutment and dividing the annular groove into a suction chamber impinged upon by the lubricant via a suction bore, and a delivery chamber from where the lubricant is directed through a discharge bore and via the adjacent tapered-roller bearing, if any, of the crankshaft to the connecting-rod bearing.

This design ensures an absolutely dependable forced lubrication even at low operational speed, at the same time avoiding the risk of inadequate connecting-rod bearing lubrication inherent in conventional scoop-type lubricating systems.

Although the design according to the invention offers all the advantages of a definitely continuous lubrication, the expense involved in this lubricating system is certainly warrantable economically. Moreover, the extremely simple design of the oil pump ensures a high degree of operational dependability and makes the lubricating system largely independent from maintenance operations.

Under certain circumstances, it is also possible according to the invention, to take advantage of a well-known particularity of tapered-roller bearings, according to which lubricant introduced in the said bearing has a tendency to flow from the smaller towards the larger taper flank of the roller race. It is thus possible to boost the flow of lubricant from the delivery chamber of the pump to the crankshaft.

For the passage of the lubricant emerging from the delivery chamber of the oil pump to the connecting-rod bearing appropriate connecting ducts have to be provided. According to another embodiment of the invention it is particularly advantageous to provide on the crank web of the crankshaft facing the vane-type oil pump an oil cage having an open-worked front end, into which a collar protrudes which communicates via the discharge bore with the delivery chamber of the pump and projects inwardly from the adjacent tapered-roller bearing, the said oil cage communicating with the connecting-rod bearing via a longitudinal bore and a transverse bore of the crankshaft pin originating at the said longitudinal bore. As the engine stops running, a certain supply of oil remains in the oil cage to lubricate the connecting-rod bearing when the engine is started. In the event of a cold start, this oil supply serves as a safety reserve. By means of the collar protruding into the oil cage any loss of oil during the passage of the lubricant into the cage is avoided.

According to another feature of the invention used in connection with the last-mentioned type of internal combustion engine it is particularly convenient to have the oil cage arranged in eccentric relation to the crankshaft axis while the longitudinal bore of the crankshaft pin is located at the point of the oil cage showing the shortest distance from the crankshaft axis. Thus the oil cage will assume the additional function of an oil filter, the oil sludge eliminated from the lubricant by the centrifugal process being predominantly deposited in the peripheral area of the cage farthest distant from the crankshaft axis and consequently diametrically opposite the longitudinal bore leading to the connecting-rod bearing. Thus the oil sludge is precluded from being deposited on the feed bore leading to the connecting-rod bearing.

According to a preferred embodiment of the invention, the pump shaft carries an entrainer disk elastically adjoining the inner side of the oil pump ring and comprising arms engaging recesses provided on the circumference of the ring. The entrainer disk provides the axial contact force required to seal the oil pump ring off against the integral abutment and also a non-rotative connection between the ring and the crankshaft.

According to the invention, the oil pump ring may be located on the crankshaft between one of the tapered-roller bearings and a cover forming the integral abutment and shutting the tapered-roller bearing bore off against the outside, the said cover comprising the suction bore and the discharge bore of the oil pump. The advantages of this design reside in its extreme simplicity and in the ease with which the readily accessible oil pump can be disassembled.

According to a further feature of the invention applied in connection with internal combustion engines having a counterbalancing shaft driven by means of the crankshaft, the inner end of which is supported in a transverse wall of the crankcase comprising the front end crankshaft bearing, it appears advisable to arrange the oil pump ring on the counterbalancing shaft between an annular shoulder provided thereon and the front-end transverse wall of the crankcase in such a manner that the said transverse wall forms the integral abutment of the oil pump comprising the suction bore and the discharge bore. The particular advantage of this arrangement resides in the fact that very little additional space is required for the accommodation of the oil pump. Since the counter-balancing shaft rotates at the same speed as the crankshaft, the performance of the pump equals that of the pump as hereabove described comprising a pump ring mounted on the crankshaft.

Figure 6:
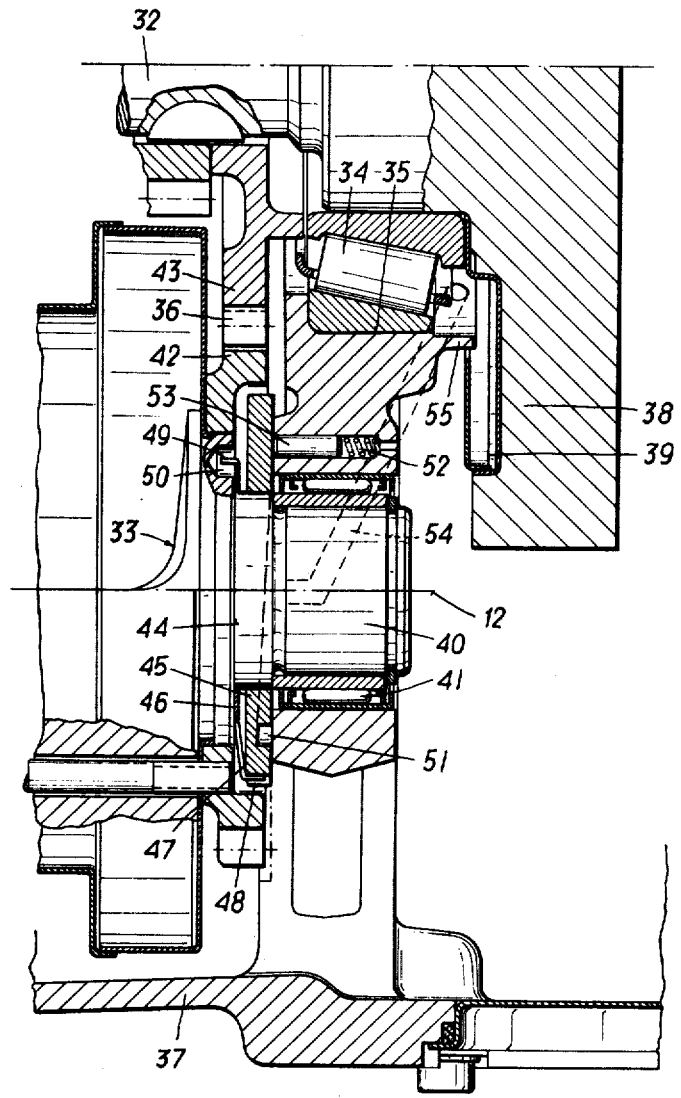

Further details of the invention will become apparent from the following description of several embodiments of the invention with reference to the accompanying drawings in which FIG. 1 shows a partial longitudinal cross-section of a single-cylinder internal combustion engine according to the invention as restricted to the area which is relevant for the purposes of the present invention, FIG. 2 is a front view of a detail of the internal combustion engine along arrow II in FIG. 1, FIGS. 3 and 4 each show a partial sectional view on lines III—III and IV—IV respectively, of FIG. 2, FIG. 5 a sectional view on line V—V of FIG. 1 and FIG. 6 is a partial longitudinal cross-section of another variety of an internal combustion engine according to the invention.

In the crankcase 1 (only partially shown in the drawing) the crankshaft 2 of a single-cylinder internal combustion engine according to the invention is supported by means of tapered-roller bearings 3 and 3'. The tapered-roller bearing 3 ( on the left side of FIG. 1) is supported axially by means of a shoulder 4 of the crankshaft bearing bore 5, while the tapered-roller bearing 3' (on the right side of FIG. 1) rests against a bearing cap 6. On the side of the tapered-roller bearing 3 the bearing bore 5 is closed by means of a cover 7 serving simultaneously as a cover for an oil pump of plain design operating basically on the lines of a vane-type oil pump.

This oil pump comprises a ring 8 slidably mounted on the crankshaft 2 and elastically adjoining the inner surface of the pump cover 7, and rotating at the same speed as the crankshaft 2. For that purpose, a flexible entrainer disk 9 is mounted on the crankshaft 2 between the ring 8 and the tapered-roller bearing 3. The said entrainer disk comprises radial arms 10 elastically adjoining the inner side of the ring 8 and engaging recesses 11 provided on the circumference of the ring 8.

On its outer front side the ring 8 is provided with an annular groove 13 in concentric relation to the crankshaft axis 12, the depth of the said annular groove diminishing gradually until at point 14 of its periphery it becomes practically non-existent. From that point 14 onward the depth of the groove increases gradually until it reaches the diametrically opposite point on its circumference. The contours of the groove base 15 are shown by dotted lines in FIG. 1.

A pin 17 loaded by means of a compression spring 16 and slidably guided in the pump cover 7 engages the annular groove 13, dividing it into a suction and a delivery chamber, thus functioning in the fashion of a vane-type oil pump. Through a suction bore 18 provided in the pump cover 7 (FIG. 3) the oil is drawn in via a suction pipe 19 from the oil sump of the internal combustion engine. A discharge bore 20 open towards the annular groove 13 is furthermore provided in the pump cover 7, the said discharge bore terminating in the annular chamber 21 located in front of the tapered-roller bearing 3. Both the suction bore and the discharge bore 20 are arranged on both sides of, and in close vicinity to, the pin 17.

On the crank web 22 of the crankshaft 2 facing the tapered-roller bearing 3 an open-work front-end oil cage 23 is mounted, into which an inwardly projecting collar 24 of the crankcase 1 protrudes in concentrical relation to the bearing bore 5. As can be seen in FIG. 5 in particular, the oil cage 23 is mounted in concentric relation to the crankshaft axis 12. At the point closest to the crankshaft axis 12 the oil cage 23 has an aperture 25 in alignment with a longitudinal bore 25 of the crankpin 27 of the crankshaft 2. The longitudinal bore 26 terminates in an axial bore 29 of the crankpin 27, closed at the opposite extremity by means of a plug 28, and is arranged in eccentric relation to the said axial bore. At this bore 29 originates a transverse bore 30 leading to the connecting-rod bearing.

The system hereabove described for the lubrication of the connecting-rod bearing operates in the following manner: As the engine is started, lubricating oil is drawn from the oil sump of the engine through the suction pipe 19 and the suction bore 18 into the suction chamber of the annular groove 13. From the delivery chamber of the pump which is terminated by the pin 17, the lubricating oil flows through the discharge bore 20 and the annular chamber 21 in the direction shown by an arrow in FIG. 4, into the tapered-roller bearing 3. Lubrication is effected without any counterpressure.

The lubricating oil then emerges at the inner side of the tapered-roller bearing 3 and flows through the collar 24 into the oil cage 23. The passage of oil through the tapered-roller bearing 3 is facilitated by the fact that tapered-roller bearings have a definite delivery sense for lubricating oil, that is, oil introduced in bearings of this type consistently flows from the narrow towards the large side of the conical roller race.

The lubricating oil is collected in the oil cage 23 and passes through the aperture 25 and the bore 26 into the axial bore 29 of the crankpin 27. Such air as is occasionally entrained by the flowing oil is allowed to escape through the bore 29 through a central aperture 31 of the plug 28. Through the transverse bore 30 the lubricating oil passes into the connecting-rod bearing. While the engine is running, oil sludge is eliminated by centrifugal action in the oil cage 23 and deposited in the area of the oil cage opposite the aperture 25. Thus the oil cage 23 simultaneously serves as an oil filter preventing impurities of the oil from reaching the connecting-rod bearing. After the engine has been stopped, the oil remaining in the oil cage 23 serves as a safety reserve, ensuring the delivery of oil to the connecting-rod bearing as soon as the engine is re-started.

The internal combustion engine illustrated in FIG. 6 differs from the embodiment of the invention hereabove described essentially insofar as the vane-type oil pump is not driven by means of the crankshaft 22, but by a counterbalancing shaft 33 drivingly connected with the former. The drawing only shows the front-end bearing area of the crankshaft 32, comprising a tapered-roller bearing 34 installed in a bearing bore 35 of the front-end cross wall 36 of the crankcase 37. The crank web 38 facing the tapered-roller bearing 34 carries the oil cage 39 (only partially shown in the drawing) which is substantially of the same design as the oil cage 23 illustrated in FIGS. 1 thru 5. The connecting ducts leading from the oil cage 39 to the connecting-rod bearing are not shown in FIG. 6.

The inner extremity 40 of the counterbalancing shaft 33 is supported by means of a needle bearing 41 at the front-end cross-wall 36 of the crankcase 33. The counterbalancing shaft 33 carries a gear ring 42 in engagement with a toothed wheel 43 of equal diameter non-rotatably mounted on the crankshaft 32.

The ring 45 of the vane-type oil pump is mounted on the counterbalancing shaft 33 between its annular shoulder 44 and the bearing 41. A flexible entrainer disk 46, whose arms 47 engage recesses 48 provided on the circumference of the ring 45, serve to press the ring 45 against the plane front face of the front-end cross-wall 36 of the crankcase. The entrainer disk 46 has angular extensions 49 engaging blind bores 50 provided on the annular shoulder 44 of the counterbalancing shaft 33 and providing a non-rotatable connection between the ring 45 and the counterbalancing shaft 33.

In the annular groove 31 of the ring 45 a pin 53 loaded by means of a compression spring 52 engages, the said pin being slidably guided in a bore of the front-end cross-wall 36 of the crankcase.

At the delivery chamber of the vane-type oil pump defined by the aforesaid elements a discharge bore 54 (indicated in the drawing by dotted lines) originates, which terminates in the area of the inwardly protruding collar 55 of the bearing bore 35. As in the embodiment of the invention illustrated in FIGS. 1 thru 5, the suction chamber of the pump communicates with the oil sump of the engine (not shown).

Operationwise the design illustrated in FIG. 6 differs from the one shown in FIGS. 1 thru 5 essentially by the fact that the oil flow emerging from the delivery end of the pump bypasses the crankshaft bearing 34 and enters the oil cage 39 directly through the collar 55.

I claim:

1. A single-cylinder internal combustion engine comprising a crankcase with a bearing bore extending through opposite front-walls of the crankcase, tapered-roller bearings, each of them located in the bearing bore of one of the two crankcase front walls, a crankshaft supported by said tapered-roller bearings and having a crankpin, a connecting rod carried on said crankpin by means of an antifriction bearings, a lubricating system for the lubrication of said antifriction bearing of the connecting rod, comprising a vane-type oil pump driven by means of said crankshaft and consisting of a pump shaft, a ring entrained by the pump shaft, an abutment for said ring, rigidly mounted on the said crankcase, spring means provided on said pump shaft and engaging with said ring for the purpose of pressing same against said abutment, an annular groove on the side of said ring facing the abutment, said annular groove extending in concentric relation to the axis of said pump shaft, the depth of the annular groove decreasing from a point of maximum depth to a point diametrically opposite where the depth of the annular groove is substantially zero, a receiving bore in said abutment which is open in the direction of said annular groove, a pin slidably guided in said receiving bore and engaging with said annular groove, a compression spring provided in said receiving bore for the purpose of pressing said pin against the annular groove, said pin dividing the annular groove in a circumferential direction into a suction chamber and a delivery chamber of the pump, a suction bore impinged upon by the lubricating oil and arranged in said abutment beside the receiving bore including said pin and terminating in said suction chamber of the pump, an oil discharge bore provided in said abutment beside said receiving bore on the side opposite the suction bore, and terminating in said delivery chamber of the pump, said oil discharge bore communicating with a transverse bore of said crankpin terminating in said antifriction bearing of the connecting rod.

2. A single-cylinder internal combustion engine according to claim 1, comprising an oil cage mounted on a crank web of said crankshaft facing said vane-type oil pump and having a perforated front end facing the vane-type oil pump, a longitudinal bore in said crankpin of the crankshaft originating at said oil cage and communicating with said transverse bore of the crankpin, an annular collar projecting inwardly from the tapered-roller bearing adjacent to the oil cage and protruding into said perforation of the oil cage, said collar defining in conjunction with the crankshaft and annular chamber communicating with said oil discharge bore of the vane-type oil pump.

3. A single-cylinder internal combustion engine according to claim 2, wherein said oil cage is arranged in eccentric relation to the axis of said crankshaft, said longitudinal bore of the crankpin being located at the point of said oil cage closest to said crankshaft axis.

4. A single-cylinder internal combustion engine according to claim 1, wherein said ring of the vane-type oil pump has a number of recesses on its circumference, said spring means of the pump consisting of an entrainer disk non-rotatably mounted on said pump shaft and elastically adjoining the inner surface of said ring, said entrainer disk comprising a number of arms engaging with said recesses of said ring.

5. A single-cylinder internal combustion engine according to claim 1, comprising a cover shutting said bearing bore of the front-end wall of the crankcase off against the outside and defining said abutment of the pump, said suction bore and said discharge bore being provided in said cover, said ring being mounted on the crankshaft between said cover and the adjacent tapered-roller bearing of the crankshaft.

6. A single-cylinder internal combustion engine according to claim 1, comprising a counterbalancing shaft carried in said crankcase and driven by means of the crankshaft, said counterbalancing shaft forming said pump shaft of the vane-type oil pump, the inner extremity of said counterbalancing shaft being supported in a cross-wall of the crankcase comprising the front-end tapered-roller bearing, said crankcase cross-wall forming said abutment of the pump and including said suction bore and said discharge bore, said ring being arranged on said counterbalancing shaft between an annular shoulder provided on same and said front-end cross-wall of the crankcase.

* * * * *